2,903,438

TREATMENT OF RANEY METAL SUSPENSIONS

Adin L. Stautzenberger and Alexander F. MacLean, Corpus Christi, Tex., assignors to Celanese Corporation of America, New York, N.Y., a corporation of Delaware No Drawing. Application February 7, 1955
Serial No. 486,688

7 Claims. (Cl. 210—54)

This invention relates to the treatment of Raney metal suspensions and relates more particularly to an improved process for the agglomeration and sedimentation of Raney metal suspensions.

Raney metal catalysts such as, for example, Raney nickel, cobalt, iron, copper and silver, are widely used in the hydrogenation of organic compounds. When the hydrogenation reaction has been carried to the desired point, it is necessary to separate the catalyst from the reaction medium. In those cases where the Raney metal catalyst is in finely divided form and is suspended in the reaction medium, such separation presents a difficult problem. Heretofore, it has been the general practice to separate the suspended Raney metal catalyst from the reaction medium by permitting the same to settle, decanting the supernatant medium and filtering the decanted medium to remove the small amount of Raney metal present therein. The Raney metal is then reused. One difficulty experienced in this process is that a long period of time is required for the bulk of the Raney metal to settle out of the reaction medium. Another disadvantage of this process is that the filtration of the supernatant medium is quite difficult owing to the tendency of some of the Raney metal particles to pass through the filter medium and of other of the Raney metal particles to clog the filter medium.

It is an important object of this invention to provide a process for the treatment of Raney metal suspensions which will be free from the foregoing and other disadvantages.

A further object of this invention is to provide a process for the treatment of Raney metal suspensions by mixing the same with a polyelectrolyte.

Other objects of this invention will be apparent from the following detailed description and claims.

According to the present invention, it has been found that a suspension of a Raney metal catalyst may be agglomerated and the agglomerated materials caused to settle out of the medium rapidly if there is added to the medium a small amount of a polyelectrolyte. Upon the addition of the polyelectrolyte, the suspended Raney metal will agglomerate into relatively large clumps that settle out of the medium quickly. The supernatant medium is then decanted and any Raney metal clumps that are suspended in the said medium may be removed therefrom with a minimum of difficulty by means of a simple filtration. The Raney metal catalyst may then be reused, for example, for the hydrogenation of a further quantity of an organic compound without suffering any apparent loss in activity as the result of its treatment with the polyelectrolyte.

This invention is applicable generally to the treatment of suspensions of Raney metal in any aqueous liquid medium. It is most effective, however, in the treatment of Raney metal suspensions wherein the proportion of water in the liquid medium is above about 50% by weight, based on total weight of the said medium. With smaller proportions of water, the efficiency with which the polyelectrolyte functions decreases. The polyelectrolyte has little or no effect on a suspension of Raney metal in an anhydrous liquid medium. The proportion of Raney metal in the liquid medium is not at all critical in the process of this invention and may range from as little as about 0.1% by weight, or even less, to as much as about 30% by weight, or even more, the percentages being based on the weight of the liquid medium. The particle size of the Raney metal should be sufficiently small so that it may be suspended readily in the liquid medium by gentle stirring or the like. While the particle size for this purpose will depend to some extent on the viscosity of the liquid medium, the Raney metal particles should, in general, be of such size that they will pass through a 150 mesh screen (U.S. standard).

The term "polyelectrolyte" is used herein to include polymeric organic substances which, when contacted with an aqueous medium, will form organic ions having a substantial number of electrical charges distributed at a plurality of positions. Examples of a large number of such polyelectrolytes which may be used in carrying out this invention are set forth in Hendrick et al, U.S. Patent No. 2,625,529, issued January 13, 1953. Specific polyelectrolytes falling within this class are those prepared by copolymerizing an unsaturated polycarboxylic acid or derivative thereof, such as the anhydride, ester, amide or salt, with a substance polymerizable therewith, or by polymerizing said polycarboxylic acid or derivative thereof alone. Other polyelectrolytes are those prepared by hydrolyzing polymers containing nitrile, acetyl or similar side chains to introduce hydroxyl or carboxyl groups into the polymers, or by treating polymers containing suitable groups to introduce therein sulfonic acid groups, or derivatives of such groups such as the salts or acids. The proportion of the polyelectrolyte needed to carry out this invention is quite small, ranging from about 0.01 to 0.1% by weight, based on the weight of the Raney metal present. The polyelectrolyte is advantageously added to the Raney metal suspension as an aqueous solution.

The following examples are given to illustrate this invention further.

*Example I*

There is introduced into a cylinder having an internal diameter of one centimeter, 20 cc. of a solution of 30% by weight aqueous 1,3-butanediol prepared by the hydrogenation of aldol and containing suspended therein 0.5 gram of Raney nickel particles that will pass a 170 mesh screen. It requires 15 minutes for the bulk of the Raney nickel to settle to the bottom of the cylinder. On decanting the supernatant liquid, it is found that the fine, still-suspended Raney nickel particles are difficult to filter owing to the tendency of the said particles to pass through and also to clog a filtering medium.

Under the same conditions, there is added to another portion of the original solution containing the Raney nickel suspended therein, 0.05 cc. of a 0.1% by weight solution of the calcium salt of a copolymer of vinyl acetate and maleic acid, having a molecular weight of at least 10,000 (Krilium). The Raney nickel particles agglomerate to form clumps that settle to the bottom of the cylinder in less than 3 minutes, more than five times as rapidly as the untreated suspension. The supernatant liquid is decanted and the small clumps remaining therein are filtered out readily without exhibiting any tendency to pass through or clog the filtering medium. The Raney nickel shows no loss in catalytic activity when it is employed in the hydrogenation of a further quantity of aldol.

*Example II*

When the same polyelectrolyte is used to treat a suspension of Raney nickel in a solution of 30% by weight aqueous 2-propanol prepared by the hydrogenation of acetone a similar improvement is obtained.

*Example III*

When the same polyelectrolye is used to treat a suspension of Raney nickel in a 30% by weight aqueous solution of trimethylolethane prepared by the hydrogenation of 2,2-dimethylolpropionaldehyde a similar improvement is obtained.

It is to be understood that the foregoing detailed description is merely given by way of illustration and that many variations may be made therein without departing from the spirit of our invention.

Having described our invention, what we desire to secure by Letters Patent is:

1. Process for the treatment of suspension of Raney metal particles in a liquid medium containing water which comprises mixing said suspensions with a polyelectrolyte to agglomerate said particles and separating said agglomerated particles from said liquid medium.

2. Process for the treatment of suspensions of Raney metal particles in a liquid medium containing above about 50% by weight of water which comprises mixing said suspensions with a polyelectrolyte to agglomerate said particles and separating said agglomerated particles from said liquid medium.

3. Process for the treatment of suspensions of Raney metal particles that will pass a 150 mesh screen in a liquid medium containing water which comprises mixing said suspensions with a polyelectrolyte to agglomerate said particles and separating said agglomerated particles from said liquid medium.

4. Process for the treatment of Raney metal particles in a liquid medium containing water which comprises mixing said suspensions with between about 0.01 and 0.1% by weight based on the weight of the Raney metal of a polyelectrolye to agglomerate said particles and separating said agglomerated particles from said liquid medium.

5. Process for the treatment of suspensions of Raney metal particles that will pass a 150 mesh screen in a liquid medium containing above about 50% by weight of water which comprises mixing said suspensions with between about 0.01 and 0.1% by weight based on the weight of the Raney metal of a polyelectrolye to agglomerate said particles and separating said agglomerated particles from said liquid medium.

6. Process for the treatment of suspensions of Raney nickel particles in a liquid medium containing water which comprises mixing said suspensions with a polyelectrolyte to agglomerate said particles and separating said agglomerated particles from said liquid medium.

7. Process for the treatment of suspensions of Raney nickel particles that will pass a 150 mesh screen in a liquid medium containing above about 50% by weight of water which comprises mixing said suspensions with between about 0.01 and 0.1% by weight based on the weight of the Raney nickel of a polyelectrolyte to agglomerate said particles and separating said agglomerated particles from said liquid medium.

References Cited in the file of this patent

UNITED STATES PATENTS

| | | |
|---|---|---|
| 1,628,190 | Raney | May 10, 1927 |
| 2,400,724 | Walker | May 21, 1946 |
| 2,625,529 | Hedrick et al. | Jan. 13, 1953 |

FOREIGN PATENTS

| | | |
|---|---|---|
| 154,799 | Australia | Jan. 19, 1954 |
| 1,083,610 | France | June 30, 1954 |

OTHER REFERENCES

Alexander: Colloid Chemistry, vol. VI, published 1946, pp. 782–799.

Gardner et al.: Factors Influencing the Flocculating Capacity of Polyacrylates, Mass. Inst. of Tech., 1953, pp. iii to 47 (51 pp.).

Michaels: Ind. Eng. Chem., vol. 46, No. 7 (1954), pp. 1485–90.